United States Patent
Srivastava et al.

(10) Patent No.: US 12,032,929 B2
(45) Date of Patent: Jul. 9, 2024

(54) SYSTEM AND METHOD FOR CROSS DOMAIN GENERALIZATION FOR INDUSTRIAL ARTIFICIAL INTELLIGENCE APPLICATIONS CLASS

(71) Applicant: TVARIT GMBH, Frankfurt am Main (DE)

(72) Inventors: Aditya Srivastava, Delhi (IN); Sanjay Shekhawat, Nagaur (IN); Rushil Gupta, Chandigarh (IN); Sachin Kumar, Hesse (DE); Kamal Galrani, Hessen (DE); Rahul Prajapat, Frankfurt am Main (DE); Naga Sai Pranay Modukuru, Stuttgart (DE); Rishabh Agrahari, Mumbai (IN); Nihal Rajan Barde, Sindhudurga (IN); Arnab Kumar Mondal, New Delhi (IN); Prathosh A.P, Mysore (IN)

(73) Assignee: TVARIT GMBH (DE)

(*) Notice: Subject to any disclaimer, the term of this patent is extended or adjusted under 35 U.S.C. 154(b) by 83 days.

(21) Appl. No.: 18/063,106

(22) Filed: Dec. 8, 2022

(65) Prior Publication Data
US 2023/0185540 A1    Jun. 15, 2023

(30) Foreign Application Priority Data
Dec. 15, 2021  (IN) .............................. 202141058407

(51) Int. Cl.
*G06N 20/00*  (2019.01)
*G06F 3/0484*  (2022.01)
(Continued)

(52) U.S. Cl.
CPC ........... *G06F 8/311* (2013.01); *G06N 3/0499* (2023.01); *G06N 3/08* (2013.01)

(58) Field of Classification Search
CPC ...... G06F 8/311; G06F 40/295; G06F 3/0482; G06F 40/216; G06F 40/30; G06F 3/0481;
(Continued)

(56) References Cited

U.S. PATENT DOCUMENTS 11,687,827 B2 *  6/2023  Murugappan .......... G06Q 10/10
                                                         706/11

FOREIGN PATENT DOCUMENTS

| CN | 111898634 A | 11/2020 |
| CN | 110907176 B | 2/2021 |
| CN | 113205132 A | 8/2021 |

OTHER PUBLICATIONS

Feature Space Transformation for Fault Diagnosis of Rotating Machinery under Different Working Conditions; Gye-Bong Jang and Sung-Bae Cho; Received: Jan. 16, 2021 / Revised: Feb. 12, 2021 / Accepted: Feb. 14, 2021 / Published: Feb. 18, 2021; https://www.mdpi.com/1424-8220/21/4/1417.
(Continued)

*Primary Examiner* — Thuy Dao
(74) *Attorney, Agent, or Firm* — Jason C. Cameron

(57) ABSTRACT

A cross domain generalization system for industrial artificial intelligence (AI) applications is disclosed. A target encoder subsystem obtains target data from a target machine product and generates lower dimensional data for obtained target data using a target artificial intelligence (AI) model. The generated lower dimensional data are corresponding to a plurality of target embeddings data. The target encoder subsystem further applies the plurality of target embeddings data into a source classifier AI model. A source classifier subsystem predicts a quality of the target machine product by generating class labels for each of the plurality of target embeddings data based on a result of the classifier AI model. The goal of the present invention is to learn features or representations such that the correlation with a label space is similar both in source and target domains while being invariant of data distributions.

26 Claims, 18 Drawing Sheets

(51) Int. Cl.
  *G06F 8/30* (2018.01)
  *G06F 9/445* (2018.01)
  *G06F 9/455* (2018.01)
  *G06N 3/0499* (2023.01)
  *G06N 3/08* (2023.01)
  *G06N 5/02* (2023.01)
  *G06N 5/04* (2023.01)

(58) Field of Classification Search
  CPC .......... G06N 3/0499; G06N 3/08; G06N 7/01; G06N 5/02; G06N 20/00; G06Q 10/10; G06Q 10/103; G06Q 10/0631; G06Q 10/101; G06Q 50/18
  See application file for complete search history.

(56) References Cited

OTHER PUBLICATIONS

Unsupervised Domain Adaptation by Domain Invariant Projection; Mahsa Baktashmotlagh; Mehrtash T. Harandi; Brian C. Lovell; Mathieu Salzmann; Published in: 2013 IEEE International Conference on Computer Vision; https:// Ieeexplore.Ieee.org/document/ 6751205.

* cited by examiner

| Parameter | Source Number of Channels | Target Number of Channels |
|---|---|---|
| Temperature | 5 | 5 |
| Additional Temperatures (oven, water) | 2 | 1 |
| Pressure | 1 | 1 |
| AirFlow | 12 | 16 |
| WaterFlow | 3 | 0 |
| Setpoints (total) | 66 | 133 |

|  | Domain | Split | Total Number of Wheels (Good, Bad) | AUC | TN-FP-FN-TP |
|---|---|---|---|---|---|
| Without TL | Target | Train | (1014,90) | 0.46 | 1003 – 11 – 90 – 0 |
|  |  | Eval | (678,60) | 0.46 | 678 – 0 – 60 – 0 |
|  |  | Test | (821,21) | 0.48 | 821 – 0 – 21 – 0 |

|  | Domain | Split | Total Number of Wheels (Good, Bad) | AUC | TN-FP-FN-TP |
|---|---|---|---|---|---|
| With TL Without using Labels | Target | Train | (1014,90) | 0.56 | 517 – 497 – 37 – 53 |
|  |  | Eval | (678,60) | 0.58 | 420 – 258 – 30 – 30 |
|  |  | Test | (821,21) | 0.52 | 517 – 304 – 11 – 10 |

FIG. 9E

| | Domain | Split | Total Number of Wheels (Good, Bad) | AUC | TN-FP-FN-TP |
|---|---|---|---|---|---|
| Without transfer learning | Target | Train | (1014,90) | 0.46 | 1003 – 11 – 90 – 0 |
| | | Eval | (678,60) | 0.46 | 678 – 0 – 60 – 0 |
| | | Test | (821,21) | 0.48 | 821 – 0 – 21 – 0 |

| | Domain | Split | Total Number of Wheels (Good, Bad) | AUC | TN-FP-FN-TP |
|---|---|---|---|---|---|
| With transfer learning Using Labels | Target | Train | (1014,90) | 0.64 | 638 – 376 – 40 – 50 |
| | | Eval | (678,60) | 0.58 | 359 – 319 – 23 – 37 |
| | | Test | (821,21) | 0.62 | 385 – 436 – 7 – 14 |

FIG. 9G

| AUC Scores | | Unsupervised – Without Labels | | Supervised – With Labels | |
|---|---|---|---|---|---|
| | | Train | Test | Train | Test |
| Source | Source | - | - | 0.85 | 0.87 |
| No Transfer Learning | All Target data with all Labels | - | - | 0.76 | 0.59 |
| | All Target Data without any Labels | 0.46 | 0.48 | - | - |
| Transfer Learning | 10% Target Data with 10% Labels | 0.58 | 0.53 | 0.76 | 0.53 |
| | 50% Target Data with 50% Labels | 0.58 | 0.61 | 0.59 | 0.55 |
| | 80% Target Data with 80% Labels | 0.5 | 0.56 | 0.65 | 0.63 |
| | All Target Data with All Labels | 0.56 | 0.52 | 0.64 | 0.62 |

FIG. 9H

SYSTEM AND METHOD FOR CROSS DOMAIN GENERALIZATION FOR INDUSTRIAL ARTIFICIAL INTELLIGENCE APPLICATIONS CLASS

EARLIEST PRIORITY DATE

This application claims priority from a Provisional patent application filed in India having Patent Application No. 202141058407, filed on Dec. 15, 2021, and titled "SYSTEM AND METHOD FOR CROSS DOMAIN GENERALIZATION FOR INDUSTRIAL ARTIFICIAL INTELLIGENCE APPLICATION"

FIELD OF INVENTION

Embodiments of the present disclosure relates to machine learning and data analytics and more particularly relates to a system and method for cross domain generalization for industrial artificial intelligence applications.

BACKGROUND

In recent years, advancements in machine learning and data analytics have been leveraged to build predictive quality models or perspective analytics models for an industrial process. The industrial process may be a low pressure die casting process, welding, cold forming, high pressure die casting and the like. Models developed are problem specific and machine specific. The models are designed to solve a particular use case for a particular machine. If there is a new requirement for a new use case for a same machine or the same use case for a new machine, the models must be retrained on data again to solve the new use case on the same machine or to solve the same use case on the new machine. The process of creating new models every time for the new use case, or the new machine is time consuming. Need of the industry is to reduce amount of time taken to develop new models by adapting knowledge of old models into the new models.

However, the aforementioned process lacks in certain aspects in the context of manufacturing industry. Since, variability in available data is huge between different machine of the same process in the case of the low pressure die casting process for example, number of sensors available, types of sensors and sampling rates are different from one machine to another machine. Additionally, due to variability in operating conditions, differences in calibration of sensors and environmental changes, and distribution of data generated from sensors vary drastically making adaptation difficult. Predictive key performance indicators from one machine to another machine may change based on the end requirements of a user. One of the challenges is to build an algorithm which adapts to different machines with minimum training or no training.

During adaptation of the new models on the new machines' problems are encountered. The problems are as follows: The first problem is missing data handling. Here, during inference, suppose the model was trained for twenty parameters however, in real time there are only fifteen parameters. This may be due to sensors failures during operation of the machine. In this case, source domain is a training data with all available parameters and target domain is data available during real time inference with missing sensor measurements. The challenge here is to provide predictions during inference time, even if some of input parameters are missing.

Further, during the machine change or plant change, suppose the model trained on the data from the pilot machine has twenty parameters and the machine in production has sixteen parameters, that is some of the parameters available in the pilot machine are not available on the machine in production, resulting in change of input space for the model. In this case, the source domain is data from the pilot machine and the target domain is the machine in production. Same changes apply for the plant change while models are transferred from one plant to another plant where there may be significant change in the number of sensors for the given machine. The challenge here is to transfer the knowledge which is gained from one machine or plant to another machine or plant with different input parameters and to reduce efforts in retraining the models from scratch.

Second problem is in data shift. Here, in covariate shift, distribution of the inputs (such as covariates that are independent variables) change, however the conditional distribution of output (i.e., the relationship between target variable and input variable) is unchanged. Further in concept shift, the relationship between the independent input and target variable output changes, while the distribution of the input remains same. Further, in prior probability shift, the distribution of target variable changes, while the distribution of input parameters remains same. Fundamental problems in a given context arises because of distributional shift between the data in different contexts such as the change of sensors, assembly line, device manufacturers and the like.

FIG. 1 is a schematic representation of a transfer learning approach 100 depicting various challenges occurred in the transfer learning of an industrial process, in accordance with prior art. FIG. 1 comprises challenge occurred during change in product type. Change in product type means change in the geometry. The change in the product type results in change of the set point parameters used to run a process. As a result, the behaviour of the process parameters change. FIG. 1 further comprises challenge occurred during change in machine. Change in machine leads to a different set of sensors and sensor placements which results in different number of process parameters.

Therefore, there is a need for an improved system and method for cross domain generalization for industrial artificial intelligence applications to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the disclosure, a cross domain generalization system for industrial artificial intelligence (AI) applications is disclosed. The cross domain generalization system includes a hardware processor, and a memory that is coupled to the hardware processor. The memory includes a set of program instructions in the form of a plurality of subsystems, configured to be executed by the hardware processor. The plurality of subsystem include a target encoder subsystem, and a source classifier subsystem. The target encoder subsystem obtains target data from a target machine product. The target data is high dimensional original multi-channel time series data. The target encoder subsystem further generates lower dimensional data for the obtained target data using a target artificial intelligence (AI)

model. The generated lower dimensional data are corresponding to a plurality of target embeddings data. The plurality of target embeddings data include compressed representation for the original multi-channel time series data of the target machine product. The target encoder subsystem further applies the plurality of target embeddings data into a source classifier AI model.

The source classifier subsystem predicts a quality of the target machine product by generating a plurality of class labels for each of the plurality of target embeddings data based on a result of the source classifier AI model.

In one aspect, a cross domain generalization method for industrial artificial intelligence (AI) applications is disclosed. The cross domain generalization method includes following steps of: (a) obtaining, by a hardware processor, target data from a target machine product; (b) generating, by the hardware processor, lower dimensional data for the obtained target data using a target artificial intelligence (AI) model; (c) applying, by the hardware processor, a plurality of target embeddings data into a source classifier AI model; and (d) predicting, by the hardware processor, a quality of the target machine product by generating a plurality of class labels for each of the plurality of target embeddings data based on a result of the source classifier AI model.

In an embodiment, the generated lower dimensional data are corresponding to the plurality of target embeddings data. In another embodiment, the plurality of target embeddings data include compressed representation for the original multi-channel time series data of the target machine product.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 9E is a tabular representation of current state of research of the present invention which includes a comparison between absence of transfer learning and during presence of transfer learning without using labels, in accordance with an embodiment of the present disclosure;

FIG. 9G are tabular representations of current state of research of the present invention which includes a comparison between absence of transfer learning and during presence of transfer learning using labels, in accordance with an embodiment of the present disclosure;

FIG. 9H is tabular representation of current state of research of the present invention depicting results summary, in accordance with an embodiment of the present disclosure;

Figure 1:
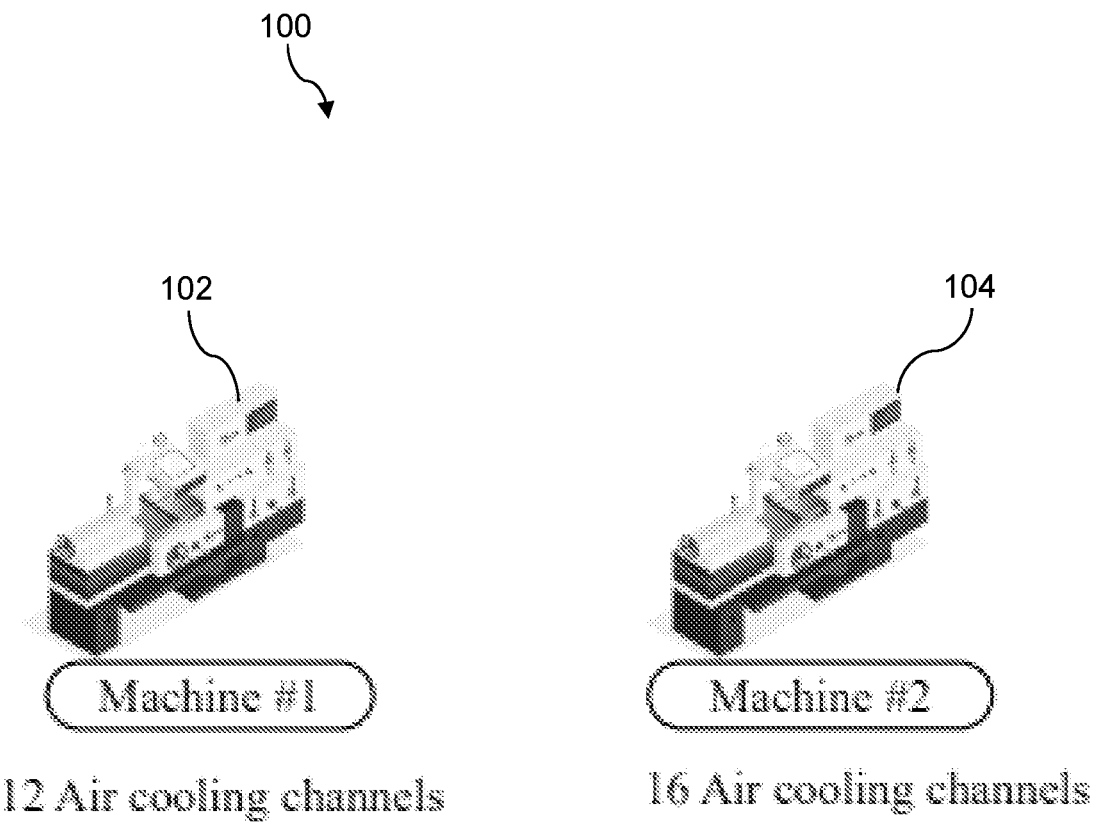
FIG. 1 is a schematic representation of a typical transfer learning approach depicting various challenges occurred in the transfer learning of an industrial process, in accordance with the prior art.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Embodiments of the present disclosure includes the cross domain generalization system and method for industrial artificial intelligence applications. A K-class classification problem includes a D-dimensional data space from which N-labelled samples draw independent and identically distributed (IID) from an unknown probability distribution. This is called a source dataset. Further, unlabelled samples which exist from a few target distributions albeit without labels during training. The cross domain generalization system and method learn features or representations such that the correlation with the label space is similar both in source and target domains while being invariant of data distributions.

Figure 2:
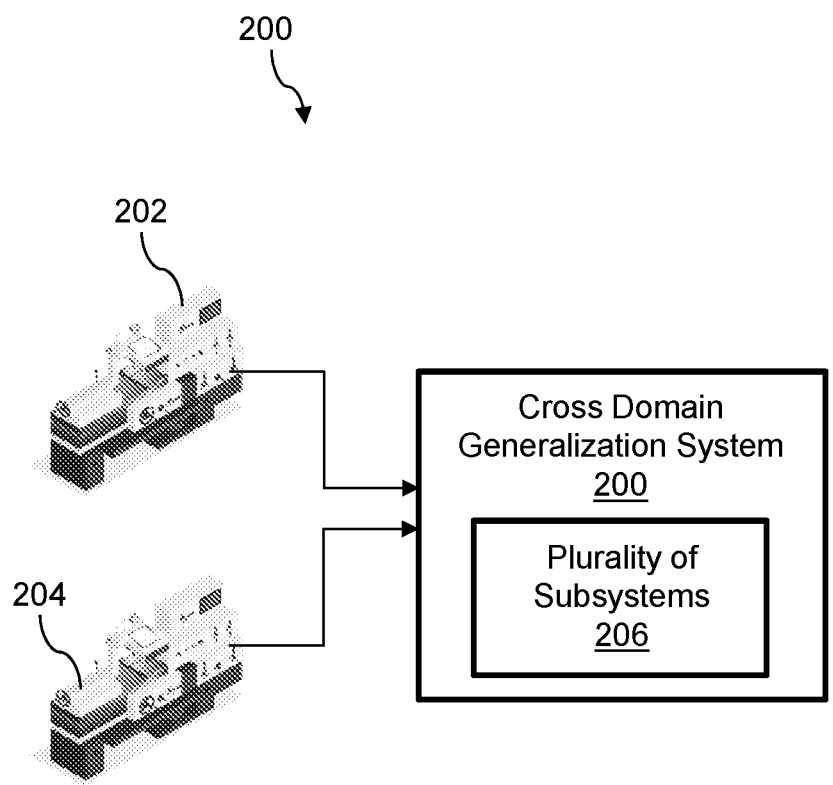
FIG. 2 is a block diagram of cross domain generalisation on artificial intelligence (AI) applications depicting overview of domain agnostic deep adversarial latent learning approach using a cross domain generalization system, in accordance with an embodiment of the present disclosure.

FIG. 2 is a block diagram of cross domain generalisation on artificial intelligence (AI) applications depicting overview of domain agnostic deep adversarial latent learning approach using a cross domain generalization system 200, in accordance with an embodiment of the present disclosure. The cross domain generalization system 200 predicts a quality of a source machine 202 product based on source data obtained from the source machine 202 product. The source data is high dimensional original multi-channel time series data. The cross domain generalization system 200 generates lower dimensional data using at least one of: a long short term memory (LSTM), convolutional neural network (CNN), multilayer perceptron (MLP), and the like based source encoder subsystem 304. The generated lower dimensional data are corresponding to a plurality of source embeddings data 402 (shown in FIG. 4).

The cross domain generalization system 200 further generates lower dimensional data corresponding to a plurality of target embeddings data 404 (shown in FIG. 4) based on target data obtained from a target machine 204 product. Specifically, the lower dimensional data are generated using at least one of: a long short term memory (LSTM), convolutional neural network (CNN), multilayer perceptron (MLP), and the like based target encoder subsystem 310. The cross domain generalization system 200 applies at least one of: the plurality of source embeddings data 402, and the plurality of target embeddings data 404 into a source classifier AI model. The cross domain generalization system 200 further predicts a quality of the source machine 202 product, and the target machine 204 product based on the results of the source classifier AI model respectively.

In an embodiment, the source machine 202 product and the target machine 204 product are same products and are belonging to same industrial AI applications. In another embodiment, the source machine 202 product and the target machine 204 product are different products. In an embodiment, the source machine 202 product and the target machine 204 product are products (e.g., wheels) that come out of the source machine 202 and the target machine 204 respectively.

Figure 3:
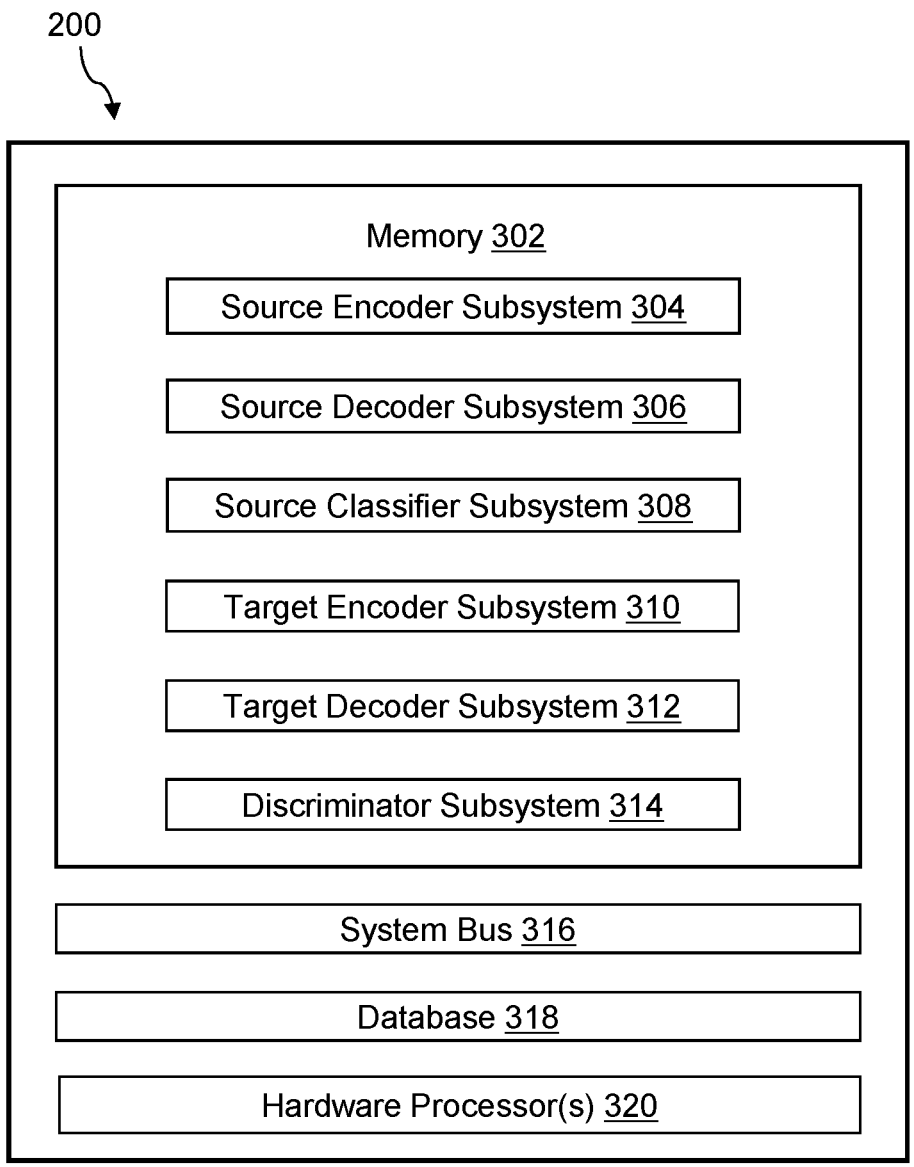
FIG. 3 is an exploded view of the cross domain generalization system, such as those shown in FIG. 2, in accordance with an embodiment of the present disclosure.

FIG. 3 is an exploded view of the cross domain generalization system 200, such as those shown in FIG. 2, in accordance with an embodiment of the present disclosure. The cross domain generalization system 200 includes a hardware processor 320. The cross domain generalization system 200 further includes a memory 302 coupled to the hardware processor 320. The memory 302 includes a set of program instructions in the form of a plurality of subsystems 206.

The hardware processor(s) 320, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof The memory 302 includes the plurality of subsystems 206 stored in the form of executable program which instructs the hardware processor 320 via a system bus 316 to perform the above-mentioned method steps. The plurality of subsystems 206 include following subsystems: a source encoder subsystem 304, a source decoder subsystem 306, a source classifier subsystem 308, a target encoder subsystem 310, a target decoder subsystem 312, and a discriminator subsystem 314.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor(s) 320.

The cross domain generalization system 200 includes the source encoder subsystem 304 that is communicatively connected to the hardware processor 320. The source encoder subsystem 304 obtains the source data from the source machine 202 product. The source encoder subsystem 304 further generates lower dimensional data for the obtained source data using the source artificial intelligence (AI) model. The source AI model may be at least one of: a long short term memory (LSTM), convolutional neural network (CNN), and the like. In an embodiment, the generation of the lower dimensional data for the obtained source data may include a conversion of the high dimensional original multi-channel time series data (i.e., high dimensional data) to the lower dimensional original multi-channel time series data (i.e., the lower dimensional data) of the source machine 202 product using the source encoder subsystem 304.

The source data is high dimensional original multi-channel time series data, which are corresponding to manufacturing of the source machine 202 product. In an embodiment, the source data corresponding to the manufacturing of the source machine 202 product includes a plurality of parameters. For example, the cross domain generalization system 200 performs transfer learning in the low pressure die casting (LPDC) manufacturing process. The plurality of parameters may include at least one of: materials, part geometry, process knowledge, maintenance information, set-point parameters, and process parameters.

The materials parameter may refer to a mechanical, thermal, and metallurgical properties of the source machine 202 product. The part geometry parameter may refer to at least one of: localized thickness, sharp corner, and surface area of the part geometry. The process knowledge parameter may refer to at least one of: heating rate, cooling rate, and atmospheric condition during manufacturing from the source machine 202 product. The maintenance information parameter may refer to at least one of: coating, lubrication, and rework procedure during manufacturing from the source machine 202 product. The set-point parameters may refer to at least one of: machine set points, pressure, flow rate during manufacturing from the source machine 202 product. The process parameter may refer to at least one of: measured parameters including pressure and temperature during manufacturing from the source machine 202 product.

In an embodiment, the lower dimensional data are corresponding to the plurality of source embeddings data 402. The plurality of source embeddings data 402 include compressed representation for the original multi-channel time series data of the source machine 202 product. The source encoder subsystem 304 further applies the plurality of source embeddings data 402 into the source classifier artificial intelligence (AI) model.

The cross domain generalization system 200 further includes the source classifier subsystem 308 that is communicatively connected to the hardware processor 320. The source classifier subsystem 308 may be connected to the source encoder subsystem 304. The source classifier subsystem 308 obtains the plurality of source embeddings data 402 of the source machine 202 product from the source encoder subsystem 304. The source classifier subsystem 308 further generates real time output data associated with the quality of the source machine 202 product based on the plurality of source embeddings data 402 of the source machine 202 product. In an embodiment, the real time output data refer to binary values of 0 and 1 representing good and bad quality of the source machine 202 product respectively.

The source classifier subsystem 308 compares the real time output data with actual output data. The source classifier subsystem 308 further determines data difference between the real time output data and the actual output data. For example, the actual output data represents the quality of the source machine 202 product as good but the real time output data represents the quality of the source machine 202 product as bad, and vice-versa. Upon determining the data difference between the real time output data and the actual output data, the source classifier subsystem 308 optimizes the source encoder subsystem 304 to enable the real time output data to be identical to the actual output data.

In an embodiment, the source classifier subsystem 308 is a multi-layer perceptron (MLP) based binary source classifier subsystem 308. The source classifier subsystem 308 further generates a plurality of class labels for each of the plurality of source embeddings data 402. In an embodiment, the plurality of class labels may include binary values of 0 and 1. The source classifier subsystem 308 predicts the quality of the source machine 202 product as good when the source classifier subsystem 308 generates a class label with a binary value 0. Further, the source classifier subsystem 308 predicts the quality of the source machine 202 product as bad when the source classifier subsystem 308 generates the class label with a binary value 1.

The cross domain generalization system 200 further includes the source decoder subsystem 306 that is communicatively connected to the hardware processor 320. The source decoder subsystem 306 obtains the lower dimensional data of the source machine 202 product from the source encoder subsystem 304. The source decoder subsystem 306 further decodes/reconstructs the lower dimensional data back into the multi-channel time series data similar to the source data of the source machine 202 product. In an embodiment, the reconstructed multi-channel time series data from the source decoder subsystem 306 is regularized to ensure the learning of more meaningful embeddings.

The cross domain generalization system 200 further includes the target encoder subsystem 310 that is communicatively connected to the hardware processor 320. The target encoder subsystem 310 obtains the target data from the target machine 204 product. The target encoder subsystem 310 further generates lower dimensional data for the obtained target data using the target artificial intelligence (AI) model. The target AI model may be at least one of: a long short term memory (LSTM), convolutional neural network (CNN), and the like. In an embodiment, the generation of the lower dimensional data for the obtained target data may include a conversion of the high dimensional original multi-channel time series data (i.e., high dimensional data) to the lower dimensional original multi-channel time series data (i.e., the lower dimensional data) of the target machine 204 product using the target encoder subsystem 310.

The target data is high dimensional original multi-channel time series data, which are corresponding to manufacturing of the target machine 204 product. In an embodiment, the target data corresponding to the manufacturing of the target machine 204 product includes a plurality of parameters. For example, the cross domain generalization system 200 performs transfer learning in the low pressure die casting (LPDC) manufacturing process. The plurality of parameters may include at least one of: materials, part geometry, process knowledge, maintenance information, set-point parameters, and process parameters.

The materials parameter may refer to a mechanical, thermal, and metallurgical properties of the target machine 204 product. The part geometry parameter may refer to at least one of: localized thickness, sharp corner, and surface area of the part geometry. The process knowledge parameter may refer to at least one of: heating rate, cooling rate, and atmospheric condition during manufacturing from the target machine 204 product. The maintenance information parameter may refer to at least one of: coating, lubrication, and rework procedure during manufacturing from the target machine 204 product. The set-point parameters may refer to at least one of: machine set points, pressure, flow rate during manufacturing from the target machine 204 product. The process parameter may refer to at least one of: measured parameters including pressure and temperature during manufacturing from the target machine 204 product.

In an embodiment, the lower dimensional data are corresponding to the plurality of target embeddings data 404. The plurality of target embeddings data 404 include compressed representation for the original multi-channel time series data of the target machine 204 product. The target encoder subsystem 310 further applies the plurality of target embeddings data 404 into the source classifier artificial intelligence (AI) model.

The source classifier subsystem 308 predicts the quality of the target machine 204 product by generating a plurality of class labels for each of the plurality of target embeddings data 404 based on the results of the source classifier AI model. In an embodiment, the source classifier subsystem 308 is a multi-layer perceptron (MLP) based binary classifier. The plurality of class labels include binary values of 0 and 1. The source classifier subsystem 308 predicts the quality of the target machine 204 product as bad when the source classifier subsystem 308 generates a class label with a binary value 1. Further, the source classifier subsystem 308 predicts the quality of the target machine 204 product as good when the source classifier subsystem 308 generates the class label with a binary value 0.

The cross domain generalization system 200 further includes the discriminator subsystem 314 that is communicatively connected to the hardware processor 320. The discriminator subsystem 314 obtains the plurality of source embeddings data 402 including the compressed representation for the original multi-channel time series data of the source machine 202 product from the source encoder subsystem 304, and the plurality of target embeddings data 404 including the compressed representation for the original multi-channel time series data of the target machine 204 product from the target encoder subsystem 310.

The discriminator subsystem 314 further compares/matches the plurality of source embeddings data 402 of the source machine 202 product with the plurality of target embeddings data 404 of the target machine 204 product. The discriminator subsystem 314 further determines whether data between the plurality of source embeddings data 402 of the source machine 202 product, and the plurality of target embeddings data 404 of the target machine 204 product are similar in distribution of the plurality of source embeddings data 402, and the plurality of target embeddings data 404.

The discriminator subsystem 314 further optimizes the target encoder subsystem 310 to enable the plurality of target embeddings data 404 to be close in distribution to the plurality of source embeddings data 402 when the data between the plurality of source embeddings data 402 of the source machine 202 product, and the plurality of target embeddings data 404 of the target machine 204 product are not identically distributed.

In an embodiment, the discriminator subsystem 314 utilizes an adversarial learning framework for (a) matching the plurality of source embeddings data 402 of the source machine 202 product with the plurality of target embeddings data 404 of the target machine 204 product, and (b) enabling the plurality of target embeddings data 404 to be close in distribution to the plurality of source embeddings data 402.

The cross domain generalization system 200 further includes the target decoder subsystem 312 that is communicatively connected to the hardware processor 320. The target decoder subsystem 312 obtains the lower dimensional data of the target machine 204 product from the target encoder subsystem 310. The target decoder subsystem 312 further decodes/reconstructs the lower dimensional data back into the multi-channel time series data similar to the target data of the target machine 204 product. In an embodiment, the reconstructed multi-channel time series data from the target decoder subsystem 312 is regularized to ensure the learning of more meaningful embeddings.

In an embodiment, the source machine 202 product and the target machine 204 product are connected a single encoder subsystem for generating the lower dimensional data from the high dimensional original multi-channel time series data when the original multi-channel time series data of the source machine 202 product and the target machine 204 product are identically distributed.

Figure 4:
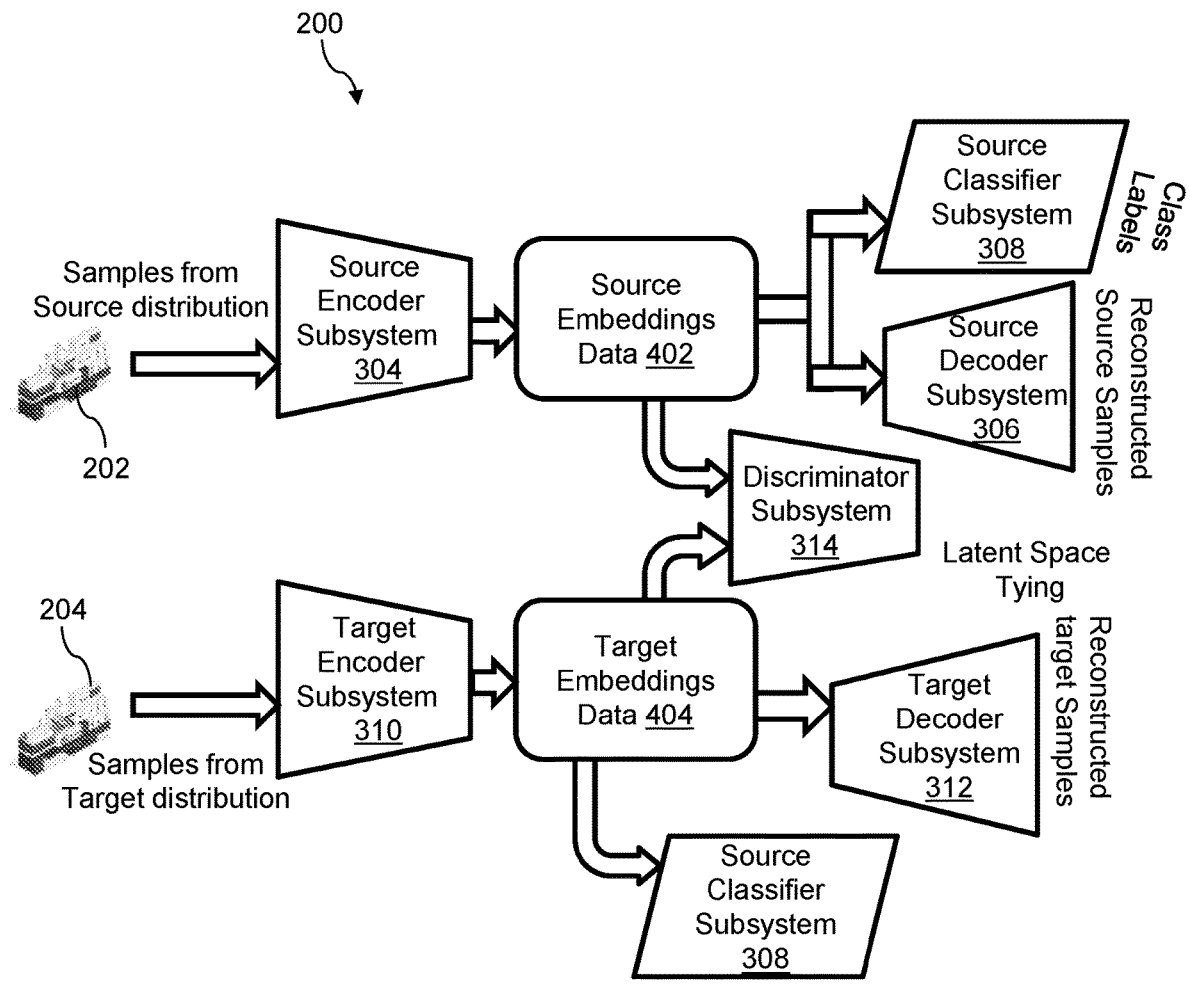
FIG. 4 is a schematic representation of the cross domain generalization system, such as those shown in FIG. 2, in accordance with an embodiment of the present disclosure.

FIG. 4 is a schematic representation of the cross domain generalization system 200, such as those shown in FIG. 2, in accordance with an embodiment of the present disclosure. The cross domain generalization system 200, in FIG. 4, includes the source machine 202 product, the target machine 204 product, the source encoder subsystem 304, the source decoder subsystem 306, the source classifier subsystem 308, the target encoder system 310, the target decoder subsystem 312, and the discriminator subsystem 314. The functions of the above said subsystems are explained in FIG. 3.

Figure 5:
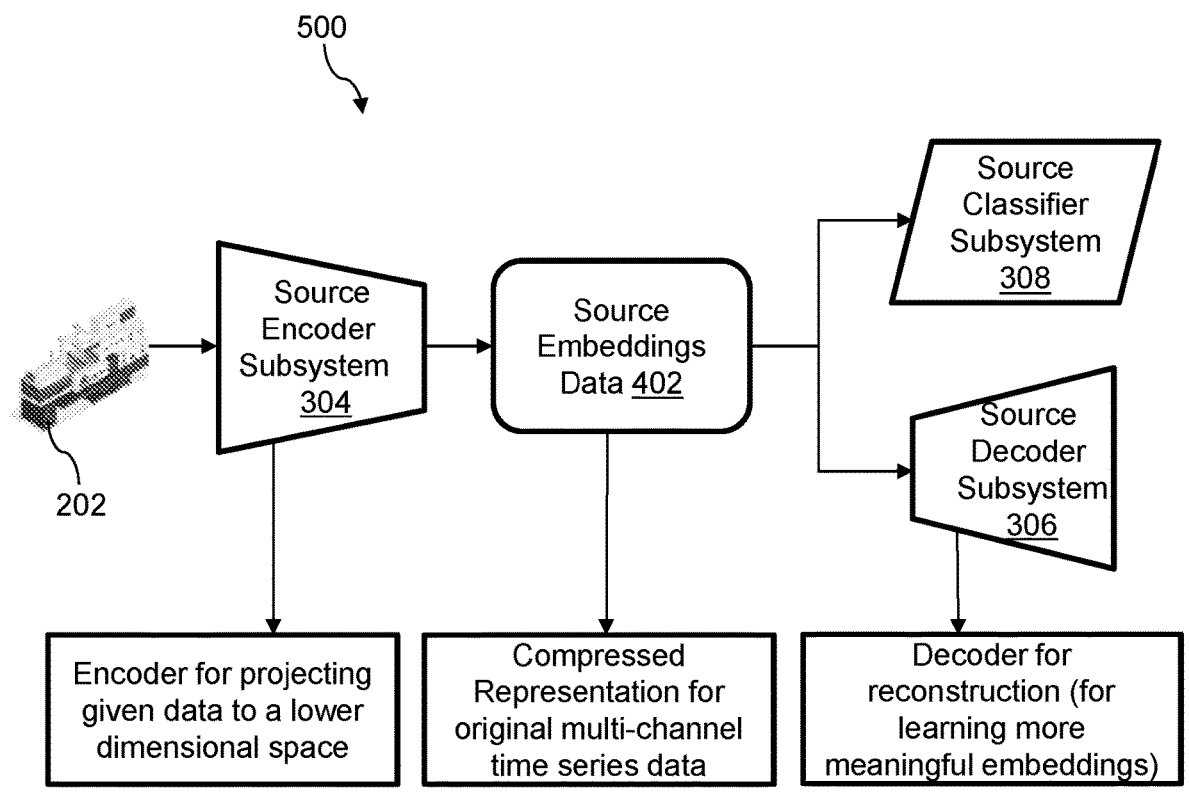
FIG. 5 is a schematic representation of a source pipeline of the cross domain generalization system, in accordance with an embodiment of the present disclosure.

FIG. 5 is a schematic representation of a source pipeline 500 of the cross domain generalization system 200 in which the plurality of source embeddings data 402 are generated, in accordance with an embodiment of the present disclosure. The source pipeline 500 of the cross domain generalization system 200, in FIG. 5, includes the source machine 202 product, the source encoder subsystem 304, the source decoder subsystem 306, and the source classifier subsystem 308. The source encoder subsystem 304 (a) obtains the source data from the source machine 202 product, (b) generates the lower dimensional data for the obtained source data using the source AI model. In an embodiment, the source AI model may be at least one of: the long short term memory (LSTM), the convolutional neural network (CNN), and the like. The lower dimensional data are corresponding to the plurality of source embeddings data 402 that include the compressed representation for the original multi-channel time series data of the source machine 202 product. The source encoder subsystem 304 applies the plurality of source embeddings data 402 into the source classifier AI model.

The source classifier subsystem 308 connected to the source encoder subsystem 304 to obtain the plurality of source embeddings data 402 of the source machine 202 product in order to predict the quality of the source machine 202 product. Further, the source decoder subsystem 306 (a) obtains the lower dimensional data of the source machine 202 product from the source encoder subsystem 304, (b) decodes/reconstructs the lower dimensional data back into the multi-channel time series data similar to the source data of the source machine 202 product, and (c) regularizes the reconstructed multi-channel time series data to ensure the learning of more meaningful embeddings.

Figure 6:
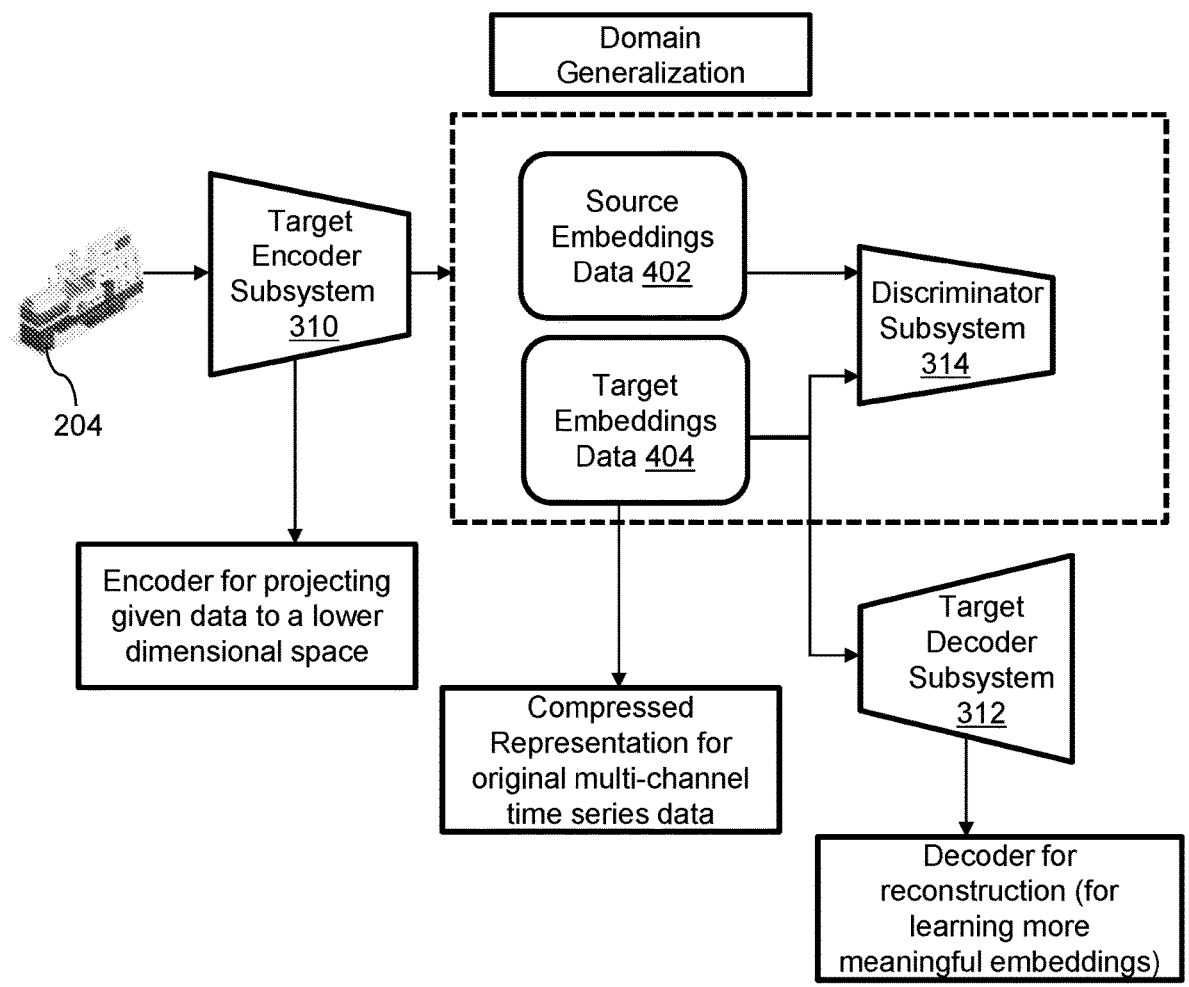
FIG. 6 is a schematic representation of the cross domain generalization system that matches a plurality of source embeddings data with a plurality of target embeddings data using a discriminator subsystem, in accordance with an embodiment of the present disclosure.

FIG. 6 is a schematic representation of the cross domain generalization system 200 that matches the plurality of source embeddings data 402 with the plurality of target embeddings data 404 using the discriminator subsystem 314, in accordance with an embodiment of the present disclosure. The cross domain generalization system 200, in FIG. 6, includes the target machine 204 product, the target encoder subsystem 310, the plurality of source embeddings data 402, the plurality of target embeddings data 404, the discriminator subsystem 314, and the target decoder subsystem 312.

The discriminator subsystem 314 obtains the plurality of source embeddings data 402 including the compressed representation for the original multi-channel time series data of the source machine 202 product from the source encoder subsystem 304, and the plurality of target embeddings data 404 including the compressed representation for the original multi-channel time series data of the target machine 204 product from the target encoder subsystem 310. Further, the discriminator subsystem 314 compares the plurality of target embeddings data 404 of the target machine 204 product with the plurality of source embeddings data 402 of the source machine 202 product.

The discriminator subsystem 314 further optimizes the target encoder subsystem 310 to enable the plurality of target embeddings data 404 to be close in distribution to the plurality of source embeddings data 402 when the data between the plurality of source embeddings data 402 of the source machine 202 product, and the plurality of target embeddings data 404 of the target machine 204 product are not identically distributed.

Further, the target decoder subsystem 312 (*a*) obtains the lower dimensional data of the target machine 204 product from the target encoder subsystem 310, (b) decodes/reconstructs the lower dimensional data back into the multi-channel time series data similar to the target data of the target machine 204 product, and (c) regularizes the reconstructed multi-channel time series data to ensure the learning of more meaningful embeddings.

Figure 7:
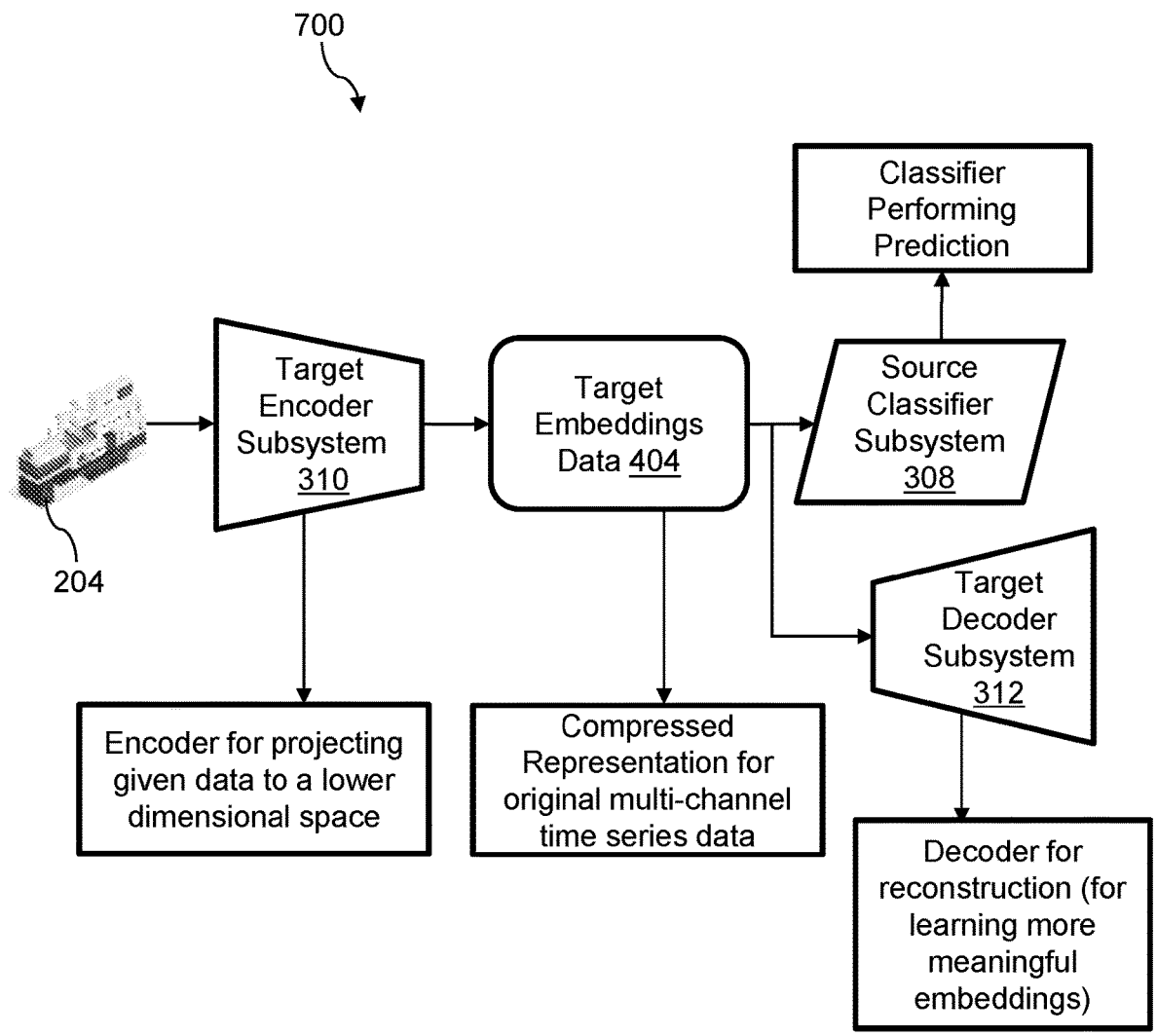
FIG. 7 is a schematic representation of a target pipeline of the cross domain generalization system, in accordance with an embodiment of the present disclosure.

FIG. 7 is a schematic representation of a target pipeline 700 of the cross domain generalization system 200, in accordance with an embodiment of the present disclosure. The target pipeline 700 of the cross domain generalization system 200, in FIG. 7, includes the target machine 204 product, the target encoder subsystem 310, the target decoder subsystem 312, and the source classifier subsystem 308.

The source classifier subsystem 308, in FIG. 7, predicts the quality of the target machine 204 product by generating the plurality of class labels for each of the plurality of target embeddings data 404 based on the results of the source classifier AI model.

Figure 8:
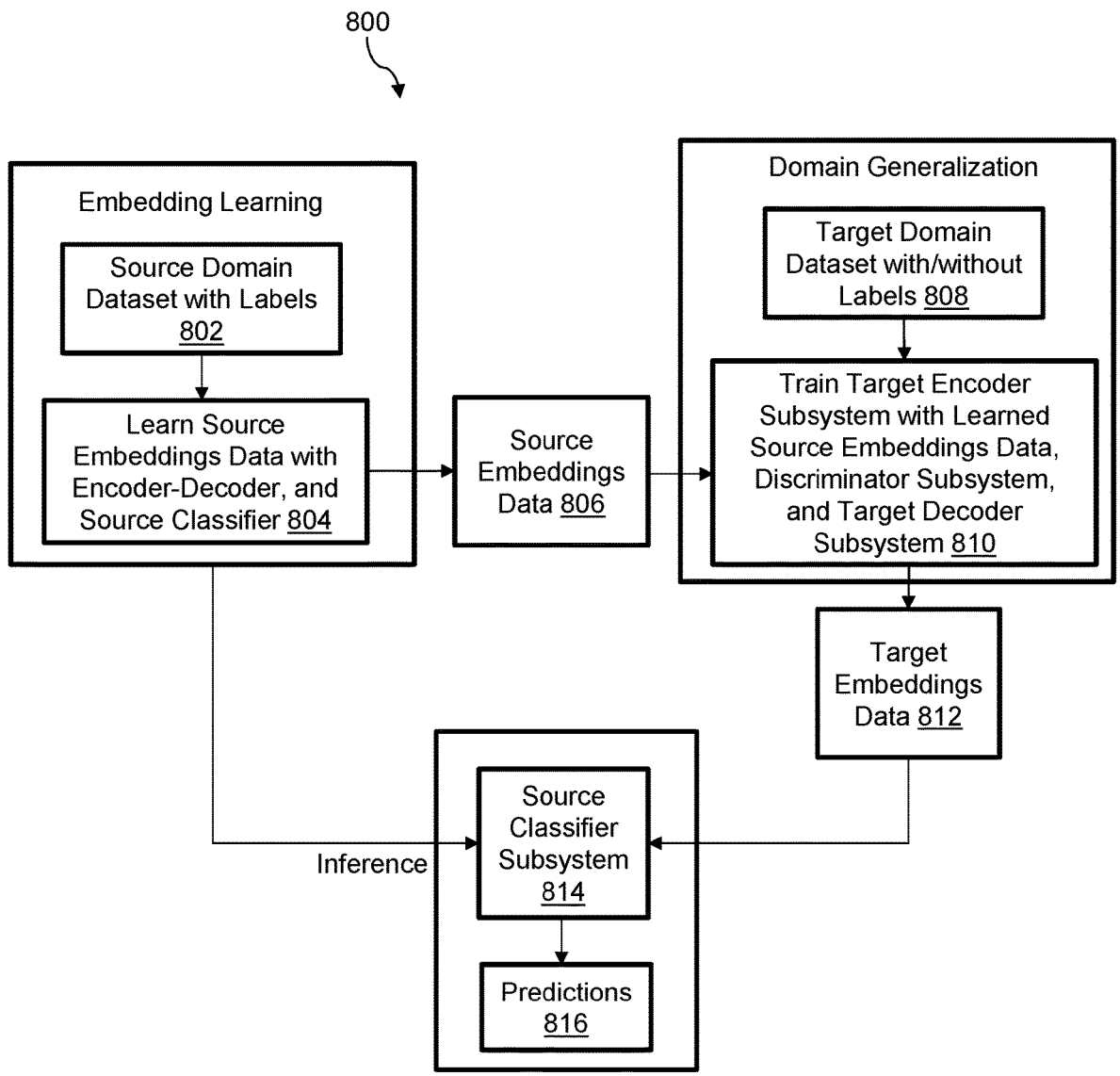
FIG. 8 is an exemplary process flow of the cross domain generalisation on artificial intelligence applications, in accordance with an embodiment of the present disclosure.

FIG. 8 is an exemplary process flow 600 of the cross domain generalization on artificial intelligence applications, in accordance with an embodiment of the present disclosure. At step 802, the source data with labels corresponding to manufacturing of the source machine 202 product are obtained from the source machine 202. In an embodiment, the labels represent the quality of the source machine 202 product, and the labels may include the binary values of 0 and 1 representing good and bad quality of the source machine 202 product respectively. The source data is the high dimensional original multi-channel time series data of the source machine 202 product.

At step 804, the source encoder subsystem 304 generates the lower dimensional data for the obtained source data using the source AI model. The source AI model may be at least one of: the long short term memory (LSTM), the convolutional neural network (CNN), and the like. In an embodiment, the lower dimensional data are corresponding to the plurality of source embeddings data 402 that include the compressed representation for the original multi-channel time series data of the source machine 202 product. The plurality of source embeddings data 402 are applied to the source classifier AI model. Further, the source classifier subsystem 308 predicts the quality of the source machine 202 product based on the plurality of source embeddings data 402 of the source machine 202 product.

At step 808, the target data with/without labels corresponding to manufacturing of the target machine 204 product are obtained from the target machine 204. The target data is the high dimensional original multi-channel time series data of the target machine 204 product. At step 810, the target encoder subsystem 310 generates the lower dimensional data for the obtained target data using the target AI model. The target AI model may be at least one of: the long short term memory (LSTM), the convolutional neural network (CNN), and the like. In an embodiment, the lower dimensional data are corresponding to the plurality of target embeddings data 404 that include the compressed representation for the original multi-channel time series data of the target machine 204 product. The plurality of target embeddings data 404 are applied to the source classifier AI model.

The plurality of source embeddings data 402, and the plurality of target embeddings data 404 are inputted (as shown in steps 806, 812) to the discriminator subsystem 314. The discriminator subsystem 314 matches the plurality of source embeddings data 402 with the plurality of target embeddings data 404 in order to determine the similarities in probability distribution between the plurality of source embeddings data 402 of the source machine 202 product, and the plurality of target embeddings data 404 of the target machine 204 product.

The discriminator subsystem 314 optimizes the target encoder subsystem 310 to enable the plurality of target embeddings data 404 to be close in distribution to the plurality of source embeddings data 402 when the discriminator subsystem 314 determines that the data between the plurality of source embeddings data 402 of the source machine 202 product, and the plurality of target embeddings data 404 of the target machine 204 product are not identically distributed. At step 814, the source classifier subsystem 308 receives the plurality of source embeddings data 402, and the plurality of target embeddings data 404 one at a time. At step 816, the source classifier subsystem 308 predicts the quality of the source machine 202 product, and the target machine 204 product by generating the plurality of class labels for each of the plurality of source embeddings data 402 of the source machine 202 product and the plurality of the target embeddings data 404 of the target machine 204 product.

Figure 9A:
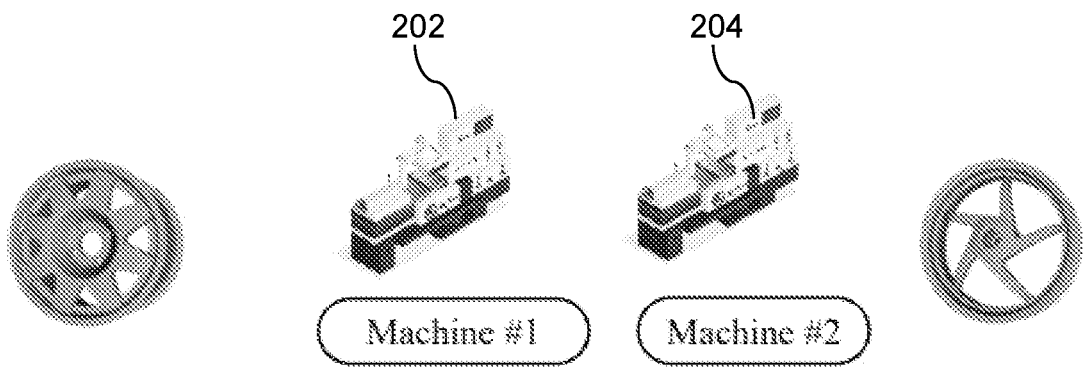
FIG. 9A depicts current state of research of the present invention on dataset information including parameters from a source machine product and a target machine product, in accordance with an embodiment of the present disclosure.

FIG. 9A depicts current state of research of the present invention on dataset information including parameters from the source machine 202 product and the target machine 204 product, in accordance with an embodiment of the present disclosure. Two datasets are considered from two users for an industrial process (e.g., a low pressure die casting (LPDC) process). The cross domain generalisation system 200 addresses two different challenges including different wheel types, and different machines products 202, 204. The cross domain generalisation system 200 considers the datasets of the source machine 202 product and the target machine 204 product, which include at least one of: temperature, additional temperature, pressure, airflow, waterflow, and the like for addressing the above mentioned challenges.

Figure 9B:
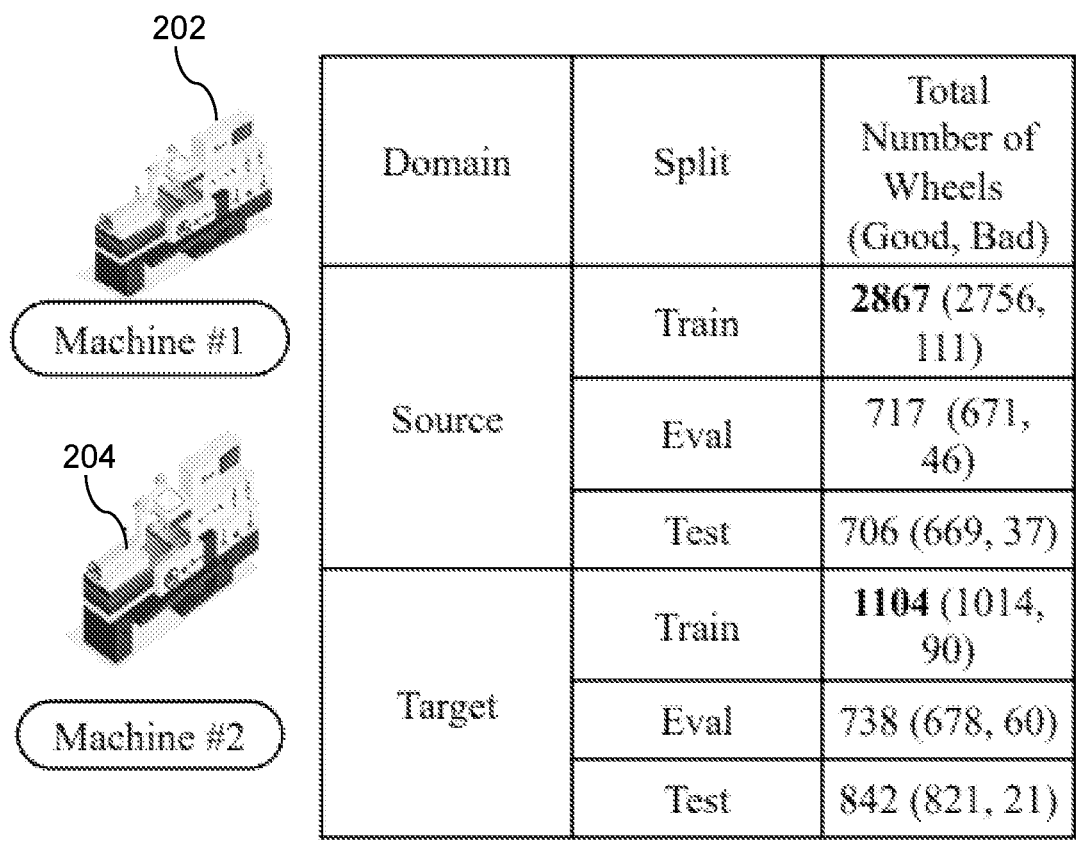
FIG. 9B depicts current state of research of the present invention on the dataset information including volume, in accordance with an embodiment of the present disclosure.

FIG. 9B depicts current state of research of the present invention on the dataset information including volume, in accordance with an embodiment of the present disclosure. Two datasets are considered from two users for an industrial process (e.g., LPDC process). The cross domain generalisation system 200 addresses two different challenges including different wheel types, and different machines products 202, 204. For example, the source machine 202 product may include 4000 wheels and the target machine 204 product may include 2600 wheels.

Figure 9C:
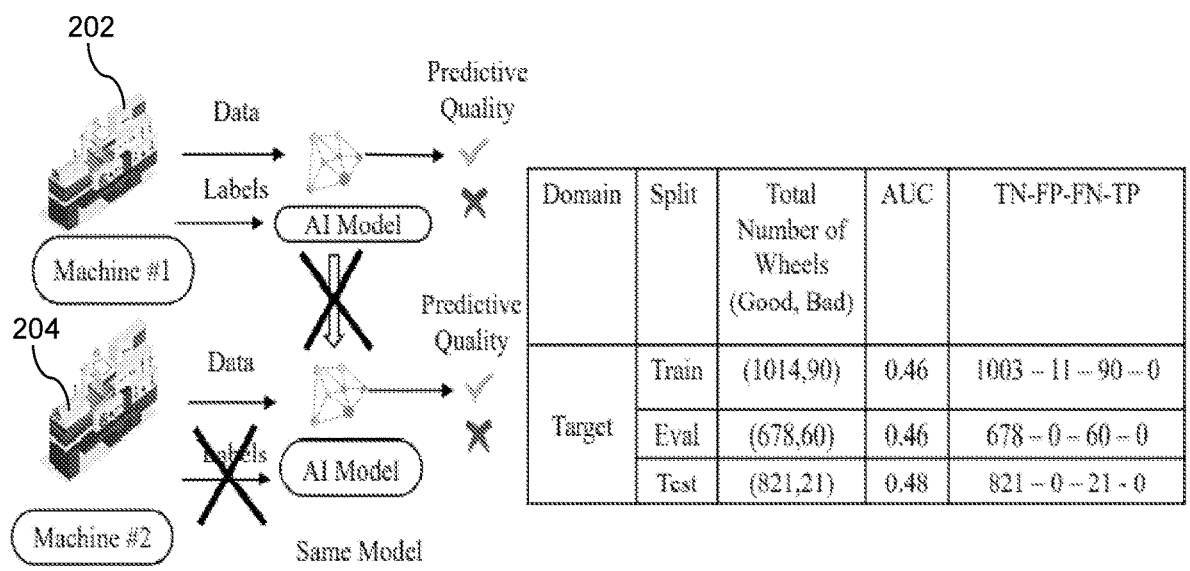
FIG. 9C is a schematic representation of current state of research of the present invention without transfer learning, in accordance with an embodiment of the present disclosure.

FIG. 9C is a schematic representation of current state of research of the present invention without transfer learning, in accordance with an embodiment of the present disclosure. The plurality of source embeddings data 402 are trained with the source artificial intelligence (AI) model only on the source data to make predictions for the target data of the target machine 204 product.

Figure 9D:
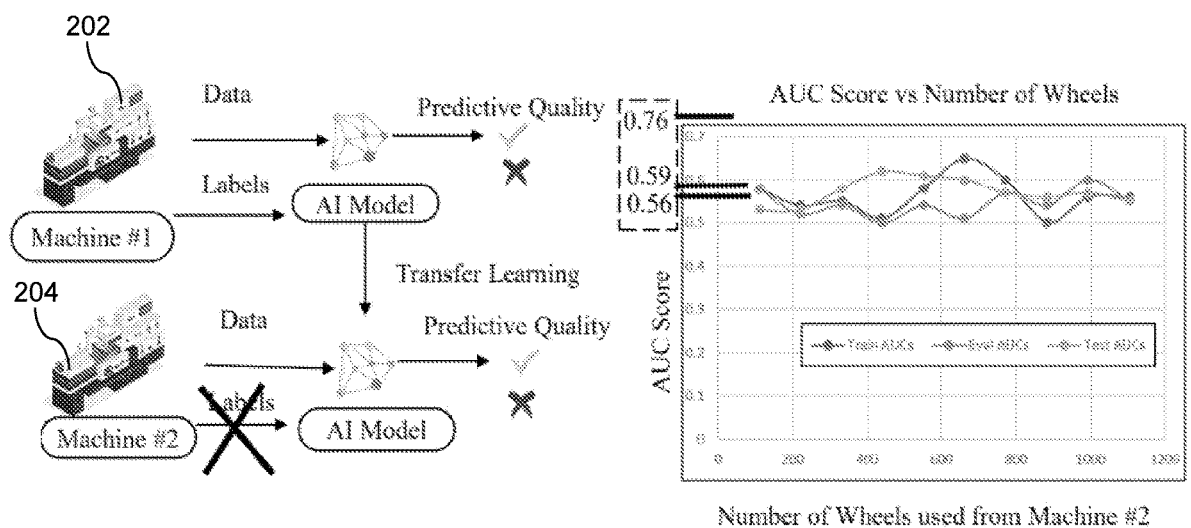
FIG. 9D is a schematic representation of current state of research of the present invention with transfer learning without using labels, in accordance with an embodiment of the present disclosure.

FIG. 9D is a schematic representation of current state of research of the present invention with transfer learning without using labels, in accordance with an embodiment of the present disclosure. Here, the plurality of source embeddings data 402 of the source machine 202 product are transferred to match with the plurality of target embeddings data 404 of the target machine 204 product using the discriminator subsystem 314. No labels are included (i.e., quality check results are available for the target machine 204 product). FIG. 9D further depicts that the scores with the models that are trained on the target machine 204 product data with full supervision.

FIG. 9E is a tabular representation of current state of research of the present invention which includes a comparison between absence of transfer learning and during presence of transfer learning without using labels, in accordance with an embodiment of the present disclosure. Here it is inferred that the cross domain generalization system 200 predicts the quality of the wheels (i.e., good wheels and bad wheels) using transfer learning models.

Figure 9F:
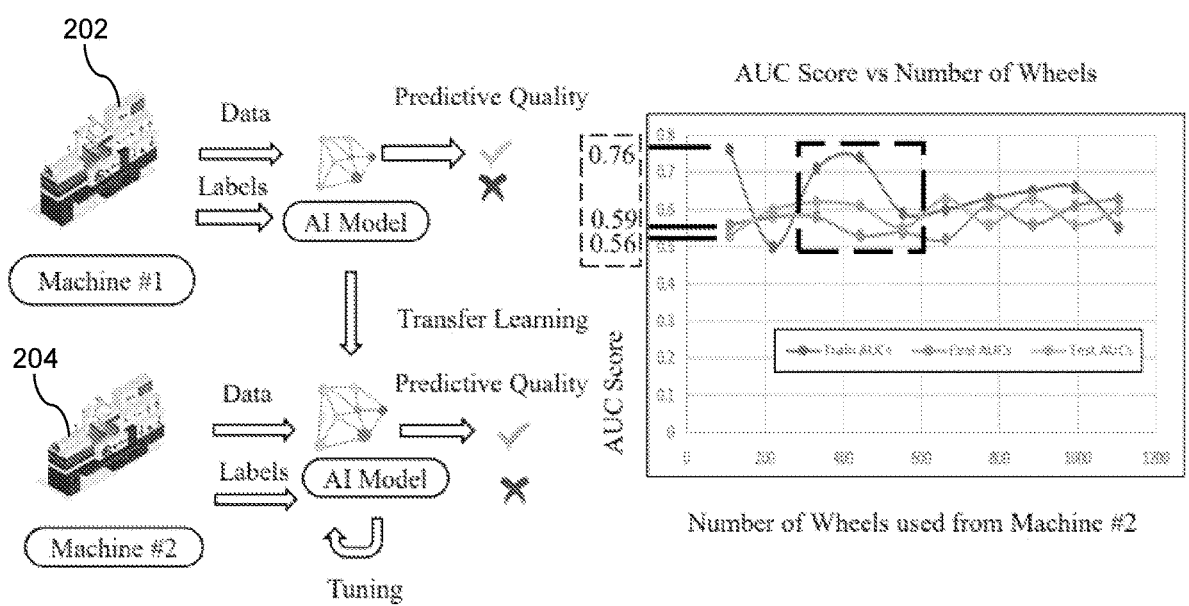
FIG. 9F is a schematic representation of current state of research of the present invention with transfer learning using labels, in accordance with an embodiment of the present disclosure.

FIG. 9F is a schematic representation of current state of research of the present invention with transfer learning using labels, in accordance with an embodiment of the present disclosure. Here, the learned data is transferred from the source machine 202 product to the target machine 204 product. The labels are present (i.e., the quality check results are available for the target machine 204 product). FIG. 9E further depicts that the scores with the models that are trained on the target machine 204 product data with full supervision.

FIG. 9G are tabular representations of current state of research of the present invention which includes a comparison between absence of transfer learning and during presence of transfer learning using labels, in accordance with an embodiment of the present disclosure. Here it is inferred that the cross domain generalization system 200 predicts the quality of the wheels (i.e., good wheels and bad wheels) using the transfer learning models.

FIG. 9H is tabular representation of current state of research of the present invention depicting results summary, in accordance with an embodiment of the present disclosure. Here, it is inferred that fraction of bad machine products to train models in (10%,50%,80%) cases is 8.1%.

Figure 10:
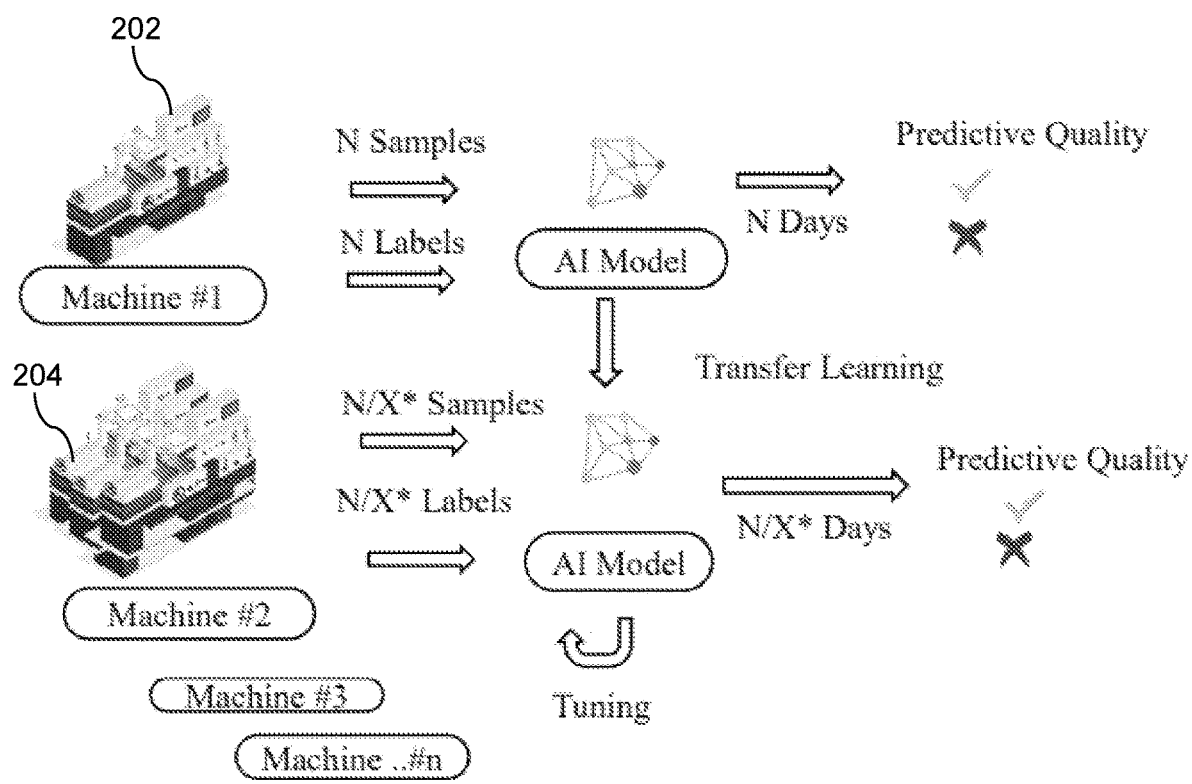
FIG. 10 is a schematic representation of cross domain generalisation on artificial intelligence applications where transfer learning enables scaling artificial intelligence models to multiple machine products with reduced data requirements and efforts, in accordance with an embodiment of the present disclosure.

FIG. 10 is a schematic representation of cross domain generalisation on artificial intelligence applications where transfer learning enables scaling artificial intelligence models to multiple machines with reduced data requirements and efforts, in accordance with an embodiment of the present disclosure. Various benefits are included as follows: knowledge of artificial intelligence models gained from the source machine 202 product can be transferred to N machines 204, $1/X^{th}*$ data is required from the target machine to $N^{th}$ machine for adapting the models and $1/X^{th}*$ efforts are required to train and deploy the AI models from the target machine 204 product, where '*' represents reduction in data requirement and training times depend on data quality and similarity between the machines.

Figure 11:
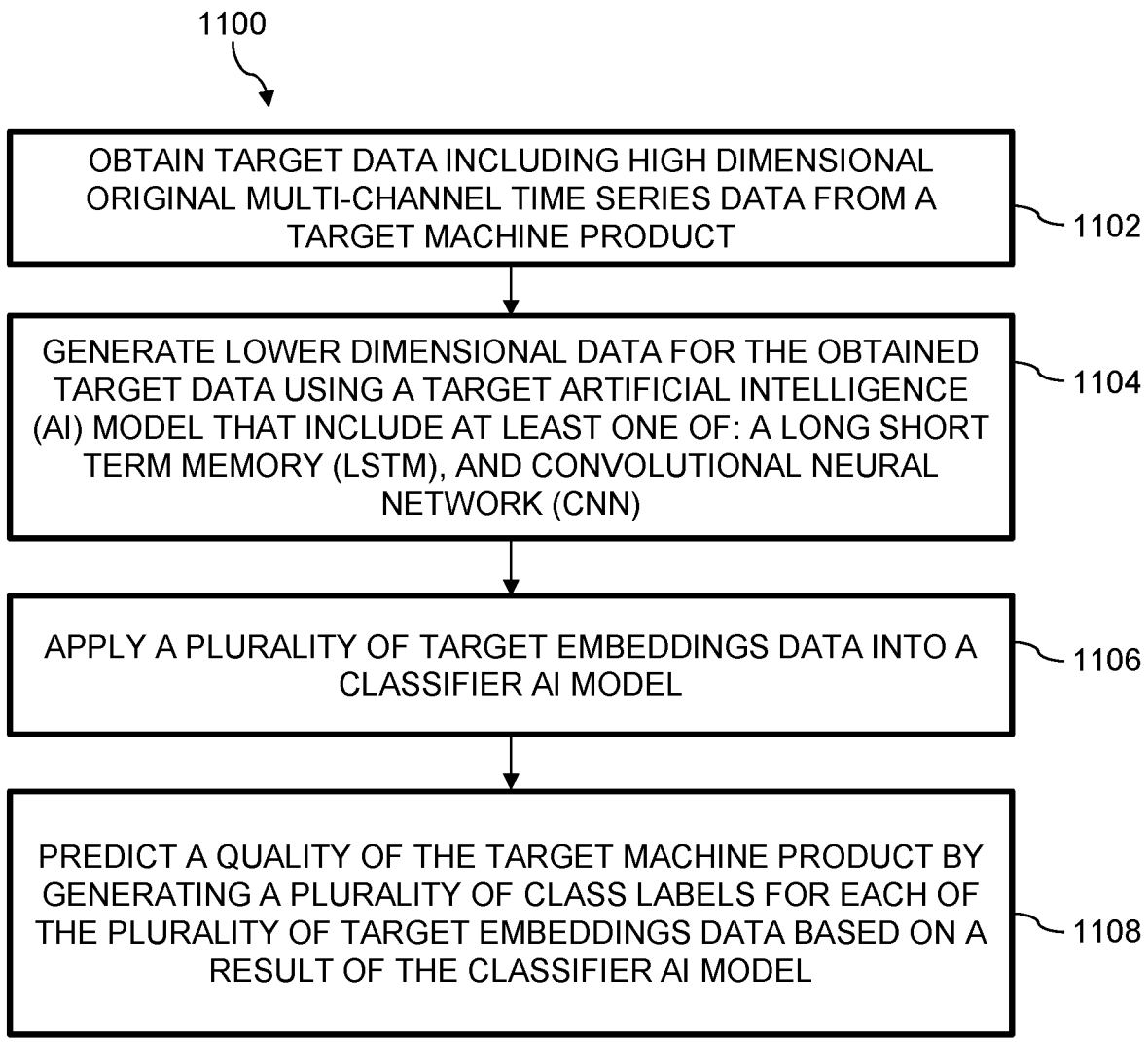
FIG. 11 is a flow chart illustrating a cross domain generalization method for industrial artificial intelligence (AI) applications using the cross domain generalization system, in accordance with an embodiment of the present disclosure.

FIG. 11 is a flow chart illustrating a cross domain generalization method 1100 for industrial artificial intelligence (AI) applications using the cross domain generalization system 200, in accordance with an embodiment of the present disclosure. At step 1102, the target data including the high dimensional original multi-channel time series data are obtained from the target machine 204 product using the target encoder subsystem 310. At step 1104, the lower dimensional data are generated for the obtained target data using the target AI model. The target AI model may be at least one of: the long short term memory (LSTM), convolutional neural network (CNN), and the like. The generation of the lower dimensional data may include the conversion of the lower dimensional data from the high dimensional original multi-channel time series data. The generated lower dimensional data are corresponding to the plurality of target embeddings data 404. The plurality of target embeddings data 404 include the compressed representation for the original multi-channel time series data of the target machine 204 product.

At step 1106, the plurality of target embeddings data 404 are applied into the source classifier AI model. At step 1108, the quality of the target machine 204 product is predicted by generating a plurality of class labels for each of the plurality of target embeddings data 404 based on a result of the source classifier AI model.

The present disclosure includes the cross domain generalization system 200 that is used to connect the source and target domain latent spaces together to follow a similar distribution using adversarial learning approaches (i.e., the MLP based discriminator subsystem 314 as a part of the adversarial learning framework). The cross domain generalization system 200 predicts the quality of the target machine 204 product using the source classifier AI model. The cross domain generalization system 200 includes the plurality of source embeddings data 402 for predicting the quality of the source machine 202 product.

The plurality of source embeddings data 402 are matched with the plurality of target embeddings data 404 to predict the quality of the target machine 204 product even though the target machine 204 product is different from the source machine 202 product. Therefore, the cross domain generalization system 200 can predict the quality of N number of different machines using the source classifier subsystem 308 trained with the plurality of source embeddings data 402 of the source machine 202 product.

The present invention helps in handling the aforementioned challenges in the context of industrial time-series data. The cross domain generalization system 200 enables scaling artificial intelligence (AI) models to multiple machines with reduced data requirements and efforts. The cross domain generalization system 200 transfers knowledge of AI models (i.e., transfer knowledge gained from one machine to N-machines), requires less data (i.e., $1/X^{th}*$ data required from $2^{nd}$ to $N^{th}$ machines for adapting the AI models), and reduces deployments times (i.e., $1/X^{th}*$ of the total efforts required to train and employ the AI models from $2^{nd}$ machine onwards), where '*' represents reduction in data requirement and training times depend on data quality and similarity between the machines.

The cross domain generalization system 200 further helps in reducing set-up costs with increase in number of machines. The cross domain generalization system 200 further utilizes the AI models that transfer knowledge from previous AI models ensuring coherent predictions. Further, the cross domain generalization system 200 reduces repetitive efforts using transfer learnings. The cross domain generalization system 200 has further advantages of: (a) fast implementation time and low project setup time, (b) learnings from previous machine lead to lower costs for additional machines, and (c) approach is applicable to multiple plants (e.g., the second plant learns from previous first plant).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, and the like.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A cross domain generalization system for industrial artificial intelligence (AI) applications, the cross domain generalization system comprising:
   a hardware processor; and
   a memory coupled to the hardware processor, wherein the memory comprises a set of program instructions in the form of a plurality of subsystems, configured to be executed by the hardware processor, wherein the plurality of subsystems comprises:
   a target encoder subsystem configured to
      obtain target data from a target machine product, wherein the target data is high dimensional original multi-channel time series data; and
      generate lower dimensional data for the obtained target data using a target artificial intelligence (AI) model, wherein the generated lower dimensional data are corresponding to a plurality of target embeddings data, and wherein the plurality of target embeddings data comprise compressed representation for the original multi-channel time series data of the target machine product;
      apply the plurality of target embeddings data into a source classifier AI model; and
   a source classifier subsystem configured to predict a quality of the target machine product by generating a plurality of class labels for each of the plurality of target embeddings data based on a result of the source classifier AI model.

2. The cross domain generalization system as claimed in claim 1, wherein the plurality of subsystems further comprise a discriminator subsystem configured to:
   match the plurality of target embeddings data with a plurality of source embeddings data, wherein the source embeddings data are generated using a source encoder subsystem; and
   determine similarities in probability distribution between the plurality of target embeddings data and the plurality of source embeddings data based on matching between the plurality of target embeddings data and the plurality of source embeddings data.

3. The cross domain generalization system as claimed in claim 2, wherein the discriminator subsystem matches the plurality of target embeddings data with the plurality of source embeddings data by
   obtaining the plurality of source embeddings data comprising compressed representation for the original multi-channel time series data of a source machine product from the source encoder subsystem, and the plurality of target embeddings data comprising the compressed representation for the original multi-channel time series data of the target machine product from the target encoder subsystem;
   comparing the plurality of source embeddings data of the source machine product with the plurality of target embeddings data of the target machine product;
   determining whether data between the plurality of source embeddings data of the source machine product, and the plurality of target embeddings data of the target machine product are similar in distribution of the plurality of source embeddings data, and the plurality of target embeddings data; and
   optimizing the target encoder subsystem to enable the plurality of target embeddings data to be close in distribution to the plurality of source embeddings data when the data between the plurality of source embeddings data of the source machine product, and the plurality of target embeddings data of the target machine product are not identically distributed.

4. The cross domain generalization system as claimed in claim 1, wherein the plurality of subsystems further comprise:
   the source encoder subsystem configured to
      obtain source data from the source machine product, wherein the source data is high dimensional original multi-channel time series data; and
      generate lower dimensional data for the obtained source data using a source AI model, wherein the generated lower dimensional data are corresponding to the plurality of source embeddings data.

5. The cross domain generalization system as claimed in claim 4, wherein the source encoder subsystem applies the plurality of source embeddings data into the source classifier AI model of the source classifier subsystem, and wherein the source classifier subsystem predicts a quality of the source machine product by
   obtaining the plurality of source embeddings data of the source machine product from the source encoder subsystem;
   generating real time output data associated with the quality of the source machine product based on the plurality of source embeddings data of the source machine product;
   comparing the real time output data with actual output data;
   determining data difference between the real time output data and the actual output data; and
   upon determining the data difference between the real time output data and the actual output data, optimizing the source encoder subsystem to enable the real time output data to be identical to the actual output data.

6. The cross domain generalization system as claimed in claim 4, wherein the source data is corresponding to a manufacturing of the source machine product, and wherein the source data corresponding to the manufacturing of the source machine product comprises a plurality of parameters comprising at least one of: materials, part geometry, process knowledge, maintenance information, set-point parameters, and process parameters.

7. The cross domain generalization system as claimed in claim 1, wherein the plurality of subsystems further comprise a source decoder subsystem, and wherein the source decoder subsystem obtains the lower dimensional data of the source machine product from the source encoder subsystem, (b) reconstructs the lower dimensional data back into the multi-channel time series data similar to the source data of the source machine product, and (c) regularizes the reconstructed multi-channel time series data with respect to the original multi-channel time series data of the source machine product.

8. The cross domain generalization system as claimed in claim 1, wherein the plurality of subsystems further comprise a target decoder subsystem, and wherein the target decoder subsystem obtains the lower dimensional data of the target machine product from the target encoder subsystem, (b) reconstructs the lower dimensional data back into the multi-channel time series data similar to the target data of the target machine product, and (c) regularizes the reconstructed multi-channel time series data with respect to the original multi-channel time series data of the target machine product.

9. The cross domain generalization system as claimed in claim 1, wherein the source machine product and the target machine product are same products, and wherein the source machine product and the target machine product are belonging to same industrial AI applications.

10. The cross domain generalization system as claimed in claim 9, wherein the source machine product and the target machine product are different products.

11. The cross domain generalization system as claimed in claim 1, wherein the discriminator subsystem utilizes an adversarial learning framework for (a) matching the plurality of source embeddings data of the source machine product with the plurality of target embeddings data of the target machine product, and (b) enabling the plurality of target embeddings data to be close in distribution to the plurality of source embeddings data.

12. The cross domain generalization system as claimed in claim 1, wherein the source machine product and the target machine product are connected to a single encoder subsystem for generating the lower dimensional data from the high dimensional original multi-channel time series data when the original multi-channel time series data of the source machine product and the target machine product are identically distributed.

13. The cross domain generalization system as claimed in claim 1, wherein the source classifier subsystem is a multilayer perceptron (MLP) based binary classifier, wherein the plurality of class labels comprise binary values of 0 and 1, wherein the source classifier subsystem predicts the quality of the target machine product as bad when the source classifier subsystem generates a class label with a binary value 1, and wherein the source classifier subsystem predicts the quality of the target machine product as good when the source classifier subsystem generates the class label with a binary value 0.

14. The cross domain generalization system as claimed in claim 1, wherein the target data is corresponding to a manufacturing of the target machine product, and wherein the target data corresponding to the manufacturing of the target machine product comprises a plurality of parameters comprising at least one of: materials, part geometry, process knowledge, maintenance information, set-point parameters, and process parameters.

15. A cross domain generalization method for industrial artificial intelligence (AI) applications, the cross domain generalization method comprising:
obtaining, by a hardware processor, target data from a target machine product, wherein the target data is high dimensional original multi-channel time series data;
generating, by the hardware processor, lower dimensional data for the obtained target data using a target artificial intelligence (AI) model, wherein the generated lower dimensional data are corresponding to a plurality of target embeddings data, and wherein the plurality of target embeddings data (404) comprise compressed representation for the original multi-channel time series data of the target machine product;
applying, by the hardware processor, the plurality of target embeddings data into a source classifier AI model; and
predicting, by the hardware processor, a quality of the target machine product by generating a plurality of class labels for each of the plurality of target embeddings data based on a result of the source classifier AI model.

16. The cross domain generalization method as claimed in claim 15, further comprising:
matching, by the hardware processor, the plurality of target embeddings data with a plurality of source embeddings data, wherein the source embeddings data are generated using a source encoder subsystem; and
determining, by the hardware processor, similarities in probability distribution between the plurality of target embeddings data and the plurality of source embeddings data based on matching between the plurality of target embeddings data and the plurality of source embeddings data.

17. The cross domain generalization method as claimed in claim 16, wherein matching the plurality of target embeddings data with the plurality of source embeddings data comprises:
obtaining, by the hardware processor, the plurality of source embeddings data comprising compressed representation for the original multi-channel time series data of a source machine product from the source encoder subsystem, and the plurality of target embeddings data comprising the compressed representation for the original multi-channel time series data of the target machine product from the target encoder subsystem;
comparing, by the hardware processor, the plurality of source embeddings data of the source machine product with the plurality of target embeddings data of the target machine product;
determining, by the hardware processor, whether data between the plurality of source embeddings data of the source machine product, and the plurality of target embeddings data of the target machine product are similar in distribution of the plurality of source embeddings data, and the plurality of target embeddings data; and
optimizing, by the hardware processor, the target encoder subsystem to enable the plurality of target embeddings data to be close in distribution to the plurality of source embeddings data when the data between the plurality of source embeddings data of the source machine product, and the plurality of target embeddings data of the target machine product are not identically distributed.

18. The cross domain generalization method as claimed in claim 15, further comprising:
obtaining, by the hardware processor, source data from the source machine product, wherein the source data is high dimensional original multi-channel time series data;
generating, by the hardware processor, lower dimensional data for the obtained source data using a source AI model, wherein the generated lower dimensional data are corresponding to the plurality of source embeddings data.

19. The cross domain generalization method as claimed in claim 18, wherein the source encoder subsystem applies the plurality of source embeddings data into the source classifier AI model of the source classifier subsystem, and wherein the source classifier subsystem predicts a quality of the source machine product by
obtaining, by the hardware processor, the plurality of source embeddings data of the source machine product from the source encoder subsystem;
generating, by the hardware processor, real time output data associated with the quality of the source machine product based on the plurality of source embeddings data of the source machine product;
comparing, by the hardware processor, the real time output data with actual output data;

determining, by the hardware processor, data difference between the real time output data and the actual output data; and upon determining the data difference between the real time output data and the actual output data, optimizing, by the hardware processor, the source encoder subsystem to enable the real time output data to be identical to the actual output data.

20. The cross domain generalization method as claimed in claim 18, wherein the source data is corresponding to a manufacturing of the source machine product, and wherein the source data corresponding to the manufacturing of the source machine product comprises a plurality of parameters comprising at least one of: materials, part geometry, process knowledge, maintenance information, set-point parameters, and process parameters.

21. The cross domain generalization method as claimed in claim 15, further comprising:
obtaining, by the hardware processor, the lower dimensional data of the source machine product from the source encoder subsystem;
reconstructing, by the hardware processor, the lower dimensional data back into the multi-channel time series data similar to the source data of the source machine product; and
regularizing, by the hardware processor, the reconstructed multi-channel time series data with respect to the original multi-channel time series data of the source machine product.

22. The cross domain generalization method as claimed in claim 15, further comprising:
obtaining, by the hardware processor, the lower dimensional data of the target machine product from the target encoder subsystem;
reconstructing, by the hardware processor, the lower dimensional data back into the multi-channel time series data similar to the target data of the target machine product; and
regularizing, by the hardware processor, the reconstructed multi-channel time series data with respect to the original multi-channel time series data of the target machine product.

23. The cross domain generalization method as claimed in claim 15, wherein (a) matching the plurality of source embeddings data of the source machine product with the plurality of target embeddings data of the target machine product, and (b) enabling the plurality of target embeddings data to be close in distribution to the plurality of source embeddings data using the discriminator subsystem with an adversarial learning framework.

24. The cross domain generalization method as claimed in claim 15, wherein the source machine product and the target machine product are connected to a single encoder subsystem for generating the lower dimensional data from the high dimensional original multi-channel time series data when the original multi-channel time series data of the source machine product and the target machine (204) product are identically distributed.

25. The cross domain generalization method as claimed in claim 15, wherein the source classifier subsystem is a multi-layer perceptron (MLP) based binary classifier, wherein the class labels comprise binary values of 0 and 1, wherein the source classifier subsystem predicts the quality of the target machine product as bad when the source classifier subsystem generates a class label with a binary value 1, and wherein the source classifier subsystem predicts the quality of the target machine product as good when the source classifier subsystem generates the class label with a binary value 0.

26. The cross domain generalization method as claimed in claim 15, wherein the target data is corresponding to a manufacturing of the target machine product, and wherein the target data corresponding to the manufacturing of the target machine product comprises a plurality of parameters comprising at least one of: materials, part geometry, process knowledge, maintenance information, set-point parameters, and process parameters.

* * * * *